US011962602B2

United States Patent
Chaudhary et al.

(10) Patent No.: US 11,962,602 B2
(45) Date of Patent: Apr. 16, 2024

(54) PHYSICAL ENVIRONMENT BASED ACCOUNT AUTHENTICATION

(71) Applicant: Capital One Services, LLC, McLean, VA (US)

(72) Inventors: Viraj Chaudhary, Katy, TX (US); Jenny Melendez, Falls Church, VA (US); Tyler Maiman, Melville, NY (US); Samuel Rapowitz, Roswell, GA (US); Joshua Edwards, Philadelphia, PA (US); David Septimus, New York, NY (US)

(73) Assignee: Capital One Services, LLC, McLean, VA (US)

( * ) Notice: Subject to any disclaimer, the term of this patent is extended or adjusted under 35 U.S.C. 154(b) by 293 days.

(21) Appl. No.: 17/589,960

(22) Filed: Feb. 1, 2022

(65) Prior Publication Data

US 2023/0247030 A1   Aug. 3, 2023

(51) Int. Cl.
| | |
|---|---|
| *H04L 9/40* | (2022.01) |
| *G06F 18/214* | (2023.01) |
| *G06F 40/279* | (2020.01) |
| *G06T 7/70* | (2017.01) |
| *G06V 10/764* | (2022.01) |
| *G06V 10/82* | (2022.01) |
| *G06V 20/40* | (2022.01) |
| *G10L 15/22* | (2006.01) |
| *G10L 15/26* | (2006.01) |
| *G10L 25/57* | (2013.01) |

(52) U.S. Cl.
CPC .......... *H04L 63/107* (2013.01); *G06F 18/214* (2023.01); *G06F 40/279* (2020.01); *G06T 7/70* (2017.01); *G06V 20/40* (2022.01); *G10L 15/22* (2013.01); *G10L 25/57* (2013.01); *H04L 63/08* (2013.01); *G06T 2207/10016* (2013.01)

(58) Field of Classification Search
CPC ..... H04L 63/107; H04L 63/08; G06F 18/214; G06F 40/279; G06T 7/70; G06T 2207/10016; G06V 20/40; G06V 10/764; G06V 10/82; G10L 5/22; G10L 5/57; G10L 15/26
See application file for complete search history.

(56) References Cited

U.S. PATENT DOCUMENTS

| | | | |
|---|---|---|---|
| 11,321,441 B2 * | 5/2022 | Ebner | .................. H04L 63/107 |
| 2019/0278993 A1 * | 9/2019 | Hoover | ............. G06Q 30/0643 |

(Continued)

*Primary Examiner* — Vu V Tran
(74) *Attorney, Agent, or Firm* — Banner & Witcoff, Ltd.

(57) ABSTRACT

Methods, systems, and apparatuses are described herein for improving computer authentication processes by using physical environment information. A computing device may receive video depicting a physical environment and process that video to identify one or more first objects. The computing device may receive a request for access to an account. The computing device may send a prompt for a physical environment description and receive, in response, an indication of one or more second objects. The indication of the one or more second objects may comprise video of the physical environment, a verbal description of the physical environment, and/or text describing the physical environment. The computing device may grant the user device access to the account based on comparing the one or more first objects to the one or more second objects.

20 Claims, 6 Drawing Sheets

(56) References Cited

U.S. PATENT DOCUMENTS

| | | | | |
|---|---|---|---|---|
| 2019/0318562 A1* | 10/2019 | Cate | ......... | G10L 15/22 |
| 2022/0330031 A1* | 10/2022 | Ratts | ......... | G06F 21/71 |
| 2023/0186660 A1* | 6/2023 | Valecha | ......... | G06F 40/40 |
| | | | | 382/206 |

* cited by examiner

"Umm... I have a white desk in the corner... and there's a window ... there is a fireplace on the other wall and a closet near the door. I have three paintings on the wall, and I recently painted the walls blue"

Processed Audio Data
(600)

FIG. 6A

My room has one door, a closet, two lamps, a window, a desk, and two monitors. The walls are blue.

Text Data
(601)

FIG. 6B

PHYSICAL ENVIRONMENT BASED ACCOUNT AUTHENTICATION

FIELD OF USE

Aspects of the disclosure relate generally to account security. More specifically, aspects of the disclosure may provide for improvements in the method in which authentication questions are generated based on the physical environment of users.

BACKGROUND

As part of determining whether to grant a user access to content (e.g., as part of determining whether to provide a caller access to a telephone system that provides banking information), a user of the user device may be prompted with one or more authentication questions. Such questions may relate to, for example, a password of the user, a personal identification number (PIN) of the user, or the like. Those questions may additionally and/or alternatively be generated based on personal information of the user. For example, when setting up an account, a user may provide a variety of answers to predetermined questions (e.g., "Where was your father born?," "Who was your best friend in high school?"), and those questions may be presented to the user as part of an authentication process. As another example, a commercially-available database of personal information may be queried to determine personal information for a user (e.g., their birthdate, birth location, etc.), and that information may be used to generate an authentication question (e.g., "Where were you born, and in what year?"). A potential downside of these types of authentication questions is that the correct answers may be obtainable and/or guessable for someone who has information about a particular user.

One approach to improving the security of computer authentication is to ask questions that would be more easily answered by a legitimate user than a malicious party. In other words, one goal of computer security may be to provide an authentication process that would be easily completed by legitimate users (such that they do not become frustrated), but may be all but impossible for malicious users to complete (e.g., to guess). In turn, computer authentication questions may be premised on information that is well-known to a legitimate user but might not be readily available to a malicious user. For example, while it may be easy to use public records to determine the birthdate of a user and thereby gain unauthorized access to that user's account, it may be significantly more difficult for a malicious entity to learn more mundane and inconsequential information about that user, such as what they ate for breakfast, what type of toothpaste they use, or what they recently watched on television. With that said, it can be difficult to acquire this information and use it for the purposes of authentication. After all, while asking a user what they had for breakfast may be a useful way to authenticate that user, it may be all but impossible to accurately track what that user has for breakfast on a day-to-day basis. Similarly, while asking a user what sort of toothpaste they use might be a useful way to authenticate that user, it also might be difficult to learn this information, and in any event such a question might not be sufficiently probative of user authenticity so as to be worth the effort of determining in the first place.

Aspects described herein may address these and other problems, and generally improve the safety of computer authentication systems by generating and providing authentication questions based on the physical environment of users.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improvements in the manner in which authentication questions are used to control access to accounts. The improvements described herein relate to generating authentication questions based on the physical environment of a user, such a based on what sort of objects they have in their living room. For example, a user may be prompted to correctly indicate the sort of art they have on their walls in their living room, to identify whether they have a television in their bedroom, to identify the location of a door in their office, or the like. To determine the answer to such questions, a computing device may receive video of a physical environment of the user, and that video may be processed to determine object(s) in the physical environment which can be used as the basis for questions. For example, a user may record and provide a video of their living room to the computing device, that video may be processed by the computing device to identify a painting on the wall of the user, and the user may be later prompted to confirm whether or not they have a painting on the wall of their living room as part of an authentication process. In this manner, information readily known by the user may be used to add security to an authentication process. Advantageously, this process may be used to, in certain circumstances, require that a user be in a particular physical location to complete an authentication process. In this way, a user might be required to, for example, be located in their office in order to access a particular account.

More particularly, some aspects described herein may provide for a computing device that may receive video depicting a physical environment. The computing device may process the video to identify one or more first objects in the physical environment. For example, the computing device may identify a desk, a chair, and a lamp in a video of a home office. The computing device may receive, from a user device, a request for access to an account associated with a user. The computing device may then send, to the user device, a prompt for a physical environment description. The computing device may receive, from the user device and in response to the prompt, one or more indications of one or more second objects. For example, the computing device may receive one or more indications of a desk and a lamp. The computing device may then grant the user device access to the account based on comparing the one or more first objects to the one or more second objects. For example, the computing device may grant the user device access to the account based on determining that the desk and the lamp are similar to those from the video of the home office.

Receiving the one or more indications of the one or more second objects may comprise receiving second video. For example, the computing device may receive, from the user device, a second video depicting the physical environment, and then process the second video to identify the one or more second objects. Additionally and/or alternatively, receiving the one or more indications of the one or more second objects may comprise receiving audio data. For example, the computing device may receive, from the user device, audio data associated with the user verbally describing the physical environment, and then process, using one or more speech recognition algorithms, the audio data to identify the one or more second objects. Additionally and/or alternatively, receiving the one or more indications of the one or more second objects may comprise receiving text data. For example, the computing device may receive, from the user device, text data describing the physical environment, and then process, using one or more natural language processing algorithms, the text data to identify the one or more second objects. Additionally and/or alternatively, receiving the one or more indications of the one or more second objects may comprise receiving data from an extended reality (XR) device, such as a virtual reality device, augmented reality device, and/or mixed reality device. For example, to receive the indication of the one or more second objects, the computing device may cause a camera of an Extended Reality (XR) device to capture second video corresponding to a current physical environment of the user, and then receive, via the XR device, the second video.

Processing the video to identify the one or more first objects may comprise use of a machine learning model. For example, the computing device may train, using training data comprising a plurality of different videos with tagged objects, a machine learning model to identify objects in videos. Then, the computing device may provide, as input to the trained machine learning model, the video, and receive, as output from the trained machine learning model and in response to the input, an indication of the one or more first objects.

The one or more first objects and the one or more second objects need not be identical. After all, a user may describe their physical environment in different ways, move furniture in and out of a room, or the like. For example, a first object of the one or more second objects may be the same as a corresponding object of the one or more first objects, but the first object may be in a different location than the corresponding object. As such, the computing device may grant access to an account based on differences between the one or more first objects and the one or more second objects. For example, the computing device may determine a first location of at least one object of the one or more first objects, determine a second location of a corresponding object of the one or more second objects, and compare the first location and the second location as part of determining whether to grant the user device access to the account. Additionally and/or alternatively, the computing device may grant access to an account based on differences between times associated with a physical environment. For example, the computing device may determine a first time associated with the video and determine a second time associated with the indication of the one or more second objects, then determine whether to grant the user device access to the account based on comparing the first time and the second time.

Corresponding method, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6A depicts processed audio data describing a physical environment; and

FIG. 6B depicts text data describing a physical environment.

DETAILED DESCRIPTION

Figure 1:
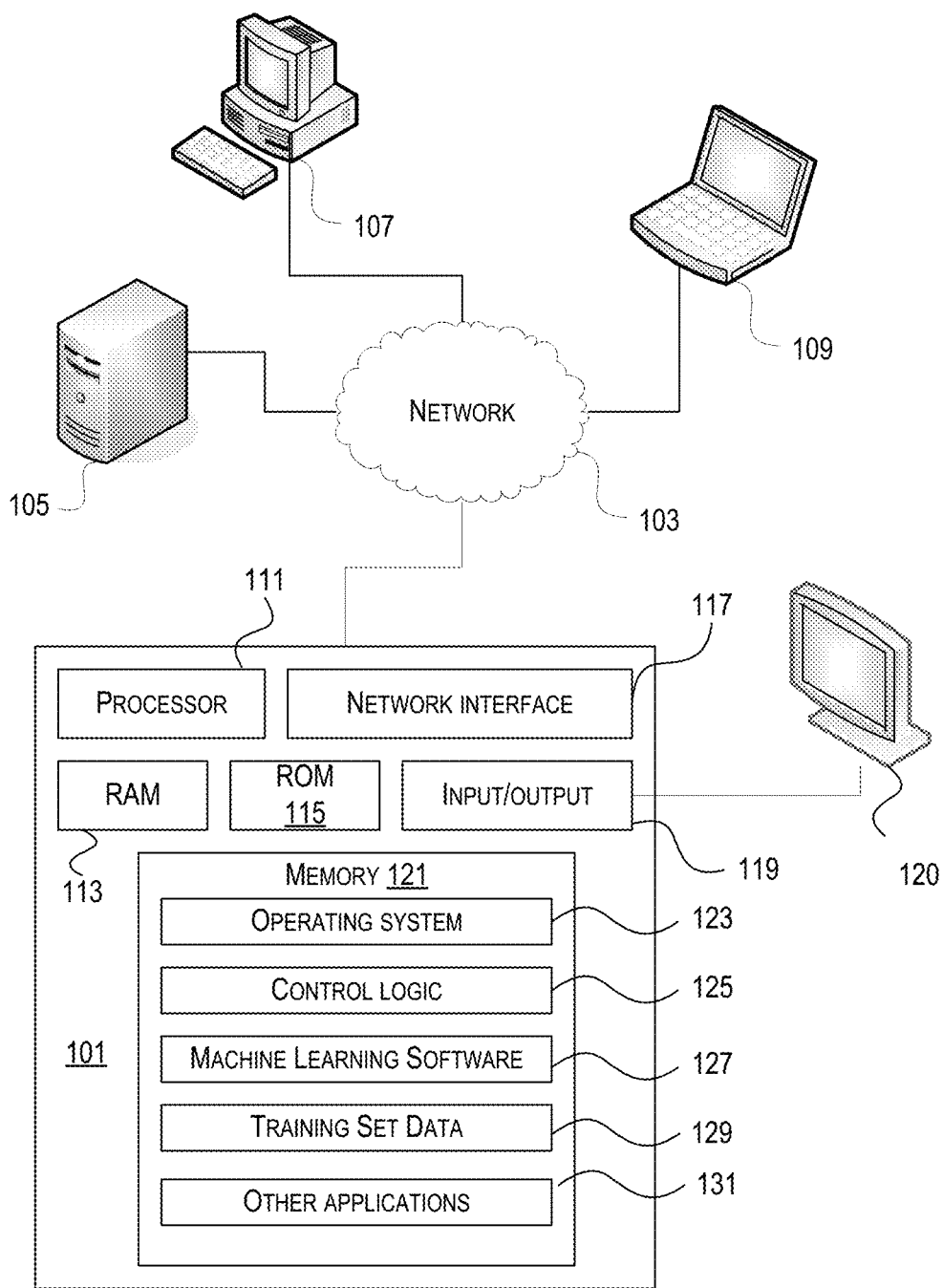
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving authentication questions used during an authentication process. In particular, the process depicted herein may process a physical environment of a user (e.g., as captured via video) to determine one or more first objects in the physical environment of the user, receive indications of one or more second objects from a user as part of an authentication process (e.g., via receiving another video of the physical environment, a verbal description of the physical environment, and/or a textual description of the physical environment), then determine whether to grant access to an account based on comparing the one or more first objects and the one or more second objects.

As an example of how the present disclosure may operate, a user may use their smartphone to record a video of their home office. The user may then provide that video to a computing device. That computing device may process (e.g., using one or more object recognition algorithms) the video to determine one or more first objects (e.g., a desk, a chair) in the home office. The user may, some time later, request access to an account. As part of the authentication process to determine whether the user should be provided access to the account, the user may be prompted to identify objects in their home office. The user may do this by using their smartphone to record a second video of the home office, by verbally describing objects in their home office, and/or by writing a textual description of their home office. The computing device may process the user's response to determine the one or more second objects, then compare the one or more first objects and the one or more second objects to determine whether to grant access to the account. In this manner, access to an account may be further secured by ensuring that a user is in a trusted and/or otherwise known physical location, and/or may be conditioned on the user recalling aspects of a physical location (e.g., a room in their home) that might not be well known to other users.

Aspects described herein improve the functioning of computers by improving the way in which computers provide authentication questions and protect computer-implemented accounts. Users are increasingly reliant on computer accounts to perform a wide variety of tasks, making computer account security more important than ever. As such, there is a strong need for methods to improve account security in a manner that does not unduly burden users. The processes described herein improve this process by performing authentication based, in part, on information that would easily by known by a genuine user, but may be difficult to answer by a malicious user. Such steps cannot be performed by a user and/or via pen and paper at least because the problem is fundamentally rooted in computing processes, involves a significantly complex amount of data and word processing, and requires steps (e.g., processing video data) which cannot be performed by a human being.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
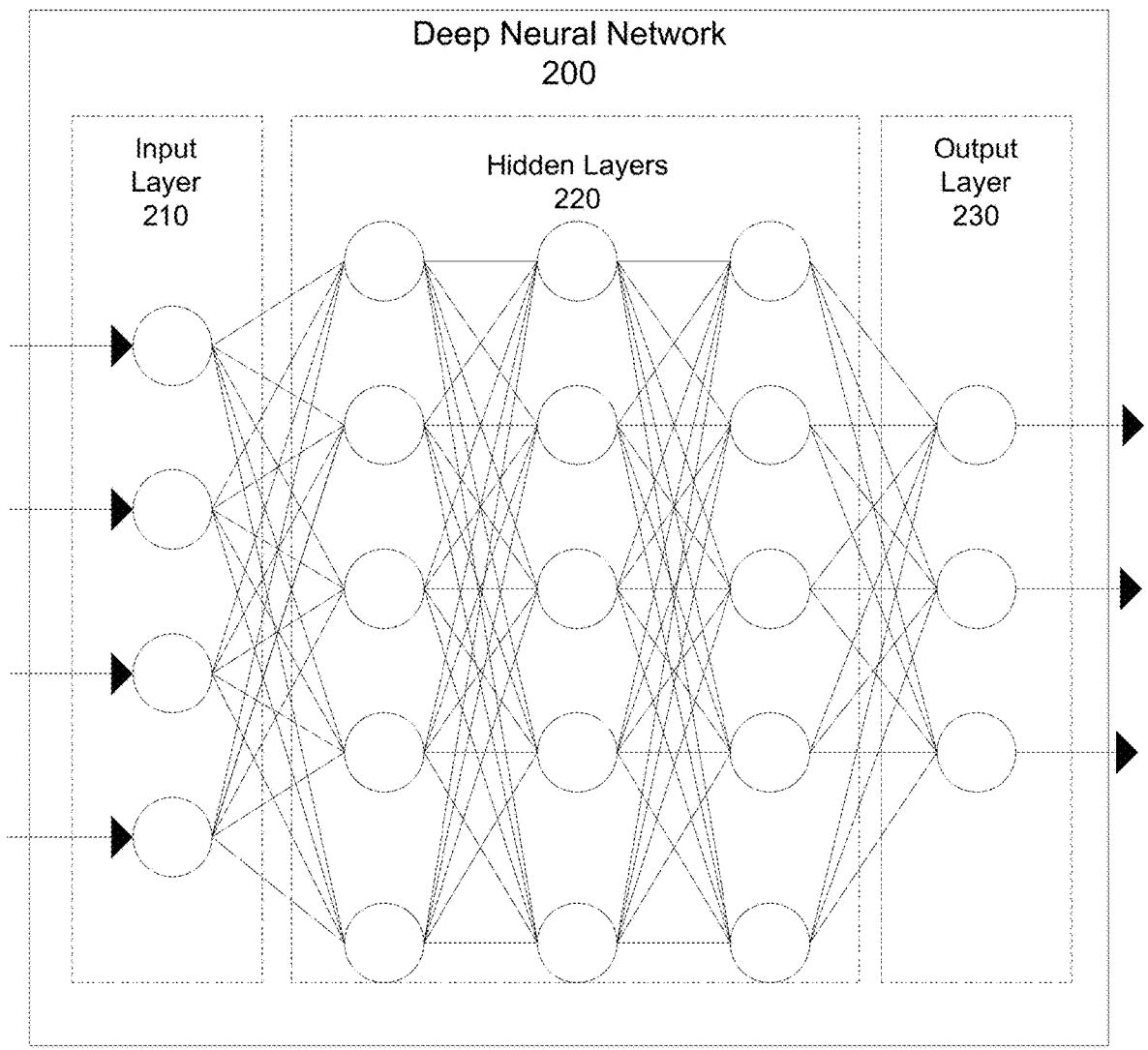
FIG. 2 depicts an example deep neural network architecture for a model according to one or more aspects of the disclosure.

FIG. 2 illustrates an example deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
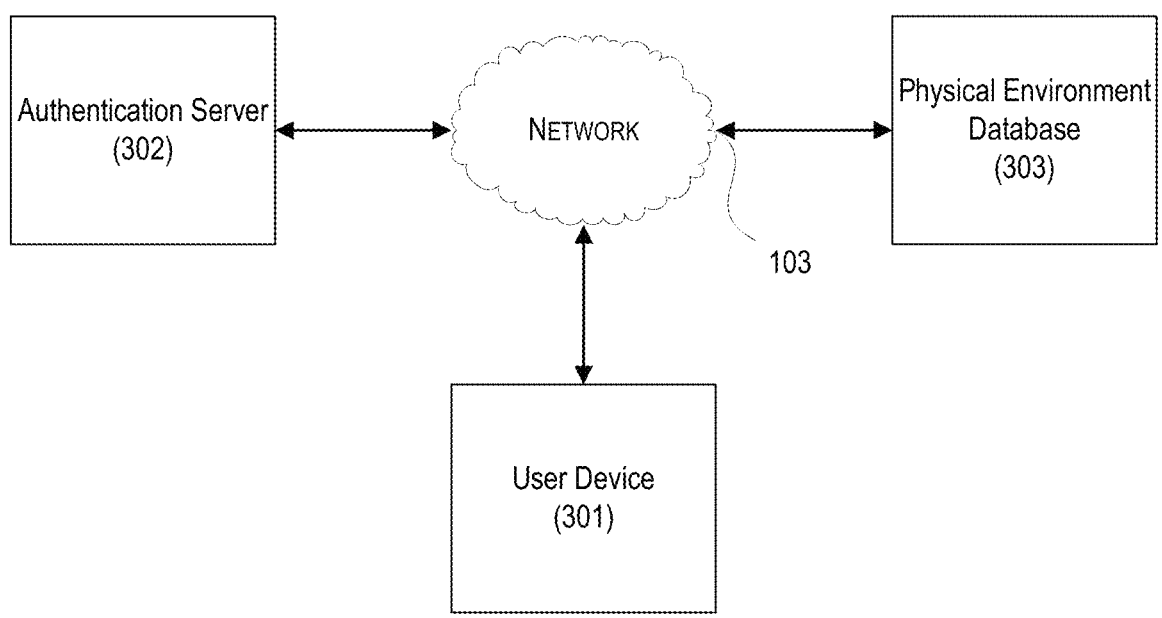
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to an authentication server 302 and a physical environment database 303. The network 103 may be the same or similar as the network 103 of FIG. 1. Each of the user device 301, the authentication server 302, and the physical environment database 303 may be implemented on one or more computing devices, such as a computing device comprising one or more processors and memory storing instructions that, when executed by the one or more processors, perform one or more steps as described further herein. For example, any of those devices may be the same or similar as the computing devices 101, 105, 107, and 109 of FIG. 1.

As part of an authentication process, the user device 301 may communicate, via the network 103, to access the authentication server 302 to request access (e.g., to a user account). The user device 301 shown here may be a smartphone, laptop, or the like, and the nature of the communications between the two may be via the Internet, a phone call, or the like. For example, the user device 301 may access a website associated with the authentication server 302, and the user device 301 may provide (e.g., over the Internet and by filling out an online form) candidate authentication credentials to that website. The authentication server 302 may then determine whether the authentication credentials are valid. In the case where the communication is telephonic, the user device 301 need not be a computing device, but may be, e.g., a conventional telephone.

The physical environment database 303 may store information about one or more physical environments of one or more users. For example, the physical environment database may store videos received from users that depict physical environments of those users, indications of one or more objects in the physical environments of one or more users, or the like. Such information (e.g., videos physical environments, lists of objects in those physical environments) may be collected from the users (and, e.g., via the user device 301) during a registration process. Additionally and/or alternatively, such information may be provided by a user at other times, such as when the user uploads, via a website or application, a video to the physical environment database 303.

Having discussed several examples of computing devices which may be used to implement some aspects as discussed further below, discussion will now turn to a method for authenticating a user based, in part, on their physical environment.

Figure 4:
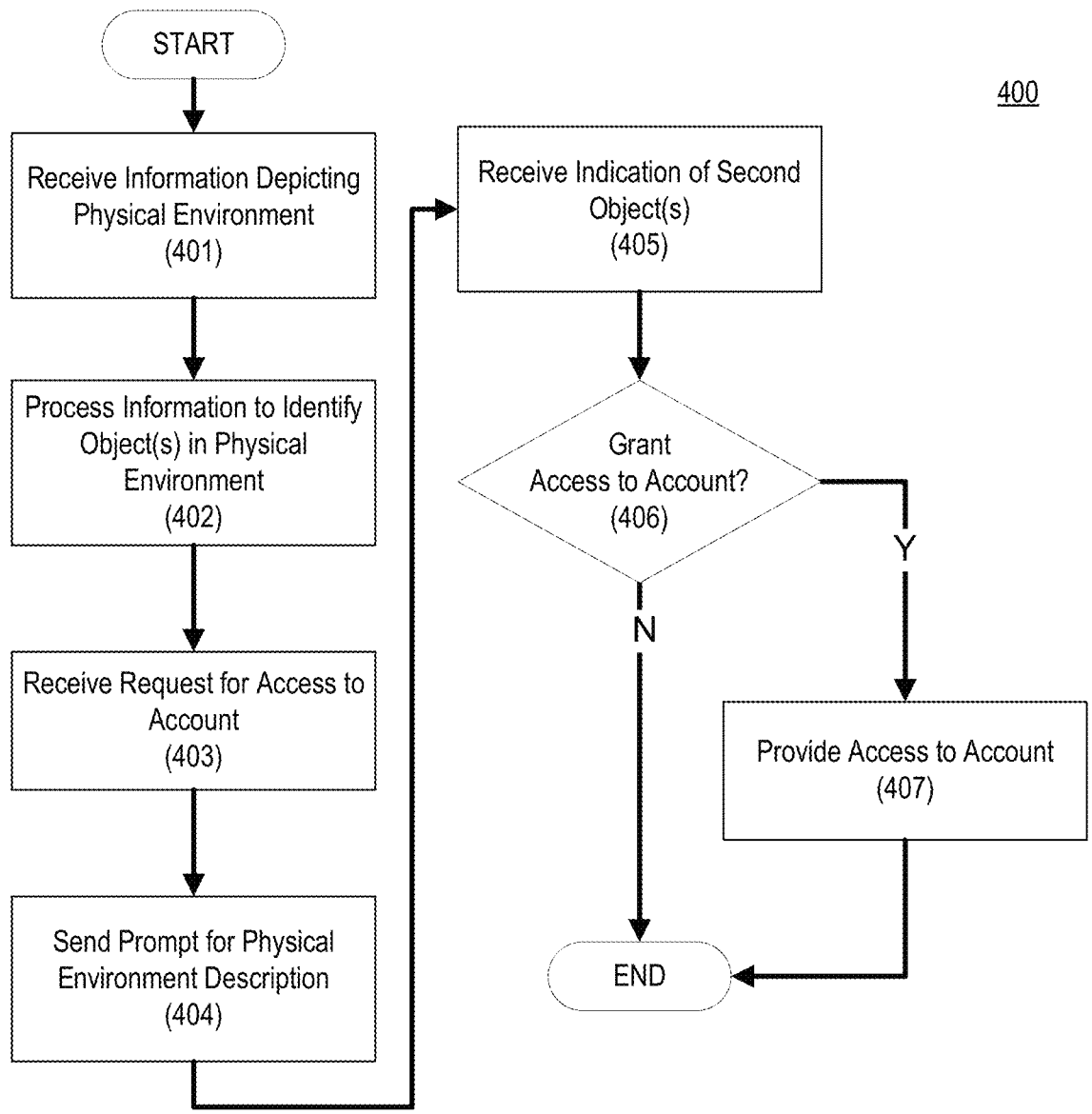
FIG. 4 depicts a flow chart comprising steps which may be performed for generating and presenting authentication questions by based on a physical environment.

FIG. 4 illustrates an example method 400 for authenticating users based on their physical environments in accordance with one or more aspects described herein. The method 400 may be implemented by a suitable computing system, as described further herein. For example, the method 400 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 4. The method 400 may be implemented in suitable program instructions, such as in machine learning software 127, and may operate on a suitable training set, such as training set data 129. The method 400 may be implemented by computer-readable media that stores instructions that, when executed, cause performance of all or portions of the method 400. The steps shown in the method 400 are illustrative, and may be re-arranged or otherwise modified as desired.

In step 401, the computing device may receive information depicting a physical environment. The information may comprise any data that indicates one or more objects in a physical environment, such as a video of the physical environment, a floor plan of the physical environment, or the like. For example, the computing device may receive video depicting a physical environment. In some circumstances, the user may be prompted to provide video of their physical environment by using a user device (e.g., the user device 301) to capture, using a camera of the user device, the physical environment. As part of step 401, additional data about the physical environment may be received. For example, the computing device may receive a floor plan or a three-dimensional scan of a physical environment from an external database.

In step 402, the computing device may process the information received in step 401 to identify one or more objects in the physical environment. For example, the computing device may process the video to identify one or more first objects in the physical environment. The information (e.g., the video) depicting the physical environment may be in a wide variety of formats and qualities. For example, one user may record their environment by moving their camera horizontally from left-to-right from one perspective, whereas another user may record their environment by physically moving about the environment and pointing a camera at objects of interest. In turn, various object recognition algorithms may be used to process the information to identify one or more objects. For example, one or more frames of video may be compared to a database of objects to determine, using a fuzzy matching algorithm, whether an object is likely to be present in the video. If a floor plan and/or three-dimensional scan of a physical environment is received, such data may be used to more accurately process the information (e.g., to identify the location of objects with respect to walls, corners, doors, and the like).

As described herein, objects need not be limited to any particular size or type of element in a physical environment. The objects may comprise immobile objects (e.g., walls, windows, floors) as well as mobile objects (e.g., desk chairs). The one or more objects may be characterized by their location (e.g., where they are in a particular physical environment), including their location with respect to other objects (e.g., a keyboard on top of a desk), their color (e.g., red, black), their shape (e.g., tall, short, wide), or the like. Objects may be classified by their category (e.g., furniture, desks, wooden objects) or with particularity (e.g., a particular brand and/or model of desk).

Processing the information may comprise use of a machine learning model, such as may be implemented via the deep neural network 200 of FIG. 2. The computing device may train, using training data comprising a plurality of different videos with tagged objects, a machine learning model to identify objects in videos. For example, one or more administrators may manually tag videos (and/or frames of videos) with bounding boxes about certain objects (e.g., chairs, art, windows). Those tagged videos may be provided as training data to the machine learning model, such that the machine learning model may thereby learn to identify certain objects within video data. Then, the computing device may provide, as input to the trained machine learning model, the information (e.g., the video) received as part of step 401. In turn, the computing device may receive, as output from the trained machine learning model and in response to the input, an indication of the one or more first objects. In this manner, the output of the machine learning model may indicate whether certain objects are in a video.

Processing the information may comprise determining the location of, color of, brand of, and/or other descriptive information of the one or more first objects. For example, the computing device may identify that a couch in a video is large, gray, and placed against a wall. As another example, the computing device may identify that a television is located on a particular wall of a room. This information may be useful because the mere presence of an object may be easily guessed by a malicious user. For example, it may be fairly easy to guess that a user has a television in their living room, though it may be somewhat more difficult to guess the particular location of that television in the living room, the size of the television, or the like.

As part of processing the information, a user may provide an indication of which objects they wish to be used as part of authentication. For example, for privacy or simplicity reasons, a user may indicate specific objects in the physical environment which can (and/or cannot) be used as part of an authentication process. In turn, the one or more first objects may comprise objects that a user has specifically indicated should be used as part of authentication processes, and may exclude objects that a user has indicated should not be used as part of the authentication processes. To allow the user to provide such indications, the computing device may display, in a user interface, detected objects and allow the user to select, in the user interface, one or more objects for use in authentication processes.

In step 403, the computing device may receive a request for access to an account. For example, the computing device may receive, from a user device, a request for access to an account associated with a user. The request may be associated with access, by a user, to a website, an application, or the like. The request may additionally and/or alternatively be associated with, for example, a user device calling into an Interactive Voice Response (IVR) system or similar telephone response system. For example, the computing device may receive an indication of a request for access to an account responsive to a user accessing a log-in page, calling a specific telephone number, or the like. The request may specifically identify an account via, for example, an account number, a username, or the like. For example, a user may call an IVR system and be identified (e.g., using caller ID) by their telephone number, which may be used to query the user account database 304 for a corresponding account.

In step 404, the computing device may send a prompt for a physical environment description. The prompt may be configured to cause a user to provide some information about objects in a physical environment (whether their current physical environment or one that they've provided information about in the past). For example, the computing device may send, to the user device, a prompt for a physical environment description. The prompt may be displayed in a user interface, such as in a user interface of the user device 301.

The prompt for the physical environment description may be a prompt for a user to provide detail about the same physical environment referenced in step 401. In this manner, the user may be prompted to, for example, record a video of the same physical environment that they previously recorded (and provided to the computing device as part of step 401). Alternatively, where (for example) the user is in a different location than the physical environment referenced in step 401, this may prompt a user to accurately describe a physical environment which they formerly recorded. For example, if a user provided a video of their home office as part of step 401, then step 404 may prompt the user to record a new video of their home office. As another example, if a user provided a video of their home office as part of step 401 but are away from home, then step 404 may prompt the user to physically describe their home office.

In step 405, the computing device may receive one or more indications of one or more second objects. For example, the computing device may receive, from the user device and in response to the prompt, an indication of one or more second objects. The one or more indications of the one or more second objects may comprise a video of the physical environment, audio corresponding to the physical environment (e.g., a verbal description of the one or more second objects), and/or text describing the one or more second objects. In this manner, the user may simply record the same physical environment using their smartphone and/or may describe the physical environment (e.g., when not physically located in the physical environment).

Receiving the one or more indications of the one or more second objects may comprise receiving video. For example, as part of receiving the indication of the one or more second objects, the computing device may receive, from the user device (e.g., the user device 301), a second video depicting the physical environment. This video may be in many ways similar to video received as part of step 401. For example, the user may use their smartphone to record their surroundings in any manner, whether sweeping a camera across their field of view, walking around their surroundings and pointing the camera at objects of interest, or the like. The computing device may then process the second video to identify the one or more second objects. This processing may be the same or similar as that described with respect to step 402. For example, the computing device may use a trained machine learning model to identify one or more objects in the second video.

Receiving the one or more indications of the one or more second objects may comprise receiving audio. For example, as part of receiving the indication of the one or more second objects, the computing device may receive, from the user device, audio data associated with the user verbally describing the physical environment. That audio may be received via one or more microphones of a user device, such as the user device 301. The computing device may then process, using one or more speech recognition algorithms, the audio data to identify the one or more second objects. For example, the user may have, as part of step 401, provided a video of their home office, but may be presently located away from their home office. Then, as part of step 404, the user may be prompted to verbally describe their home office, including objects in the home office.

Receiving the one or more indications of the one or more second objects may comprise receiving text. For example, as part of receiving the indication of the one or more second objects, the computing device may receive, from the user device, text data describing the physical environment. This text data may, like the audio data described above, be used by the user to describe a physical environment where, for example, the user is not physically located in the physical environment. For example, the user may, instead of verbally describing the physical environment, type a description of the physical environment into a text box displayed as part of a user interface by the user device 301. The computing device may then process, using one or more natural language processing algorithms, the text data to identify the one or more second objects.

Receiving the one or more indications of the one or more second objects may comprise receiving content via an XR device, such as a virtual reality, augmented reality, or mixed reality device. Increasingly, users are wearing devices (e.g., augmented reality glasses) which can be used to conveniently capture information about the physical environment of a user without necessarily requiring that the user manually record the physical environment with a camera (e.g., their smartphone camera). For example, as part of receiving the indication of the one or more second objects, the computing device may cause a camera of an Extended Reality (XR) device to capture second video corresponding to a current physical environment of the user. The computing device may then receive, via the XR device, the second video. One advantage of this process is that the XR device may be configured to execute various algorithms, such as Simultaneous Localization and Mapping (SLAM) algorithms, which may be used to determine an overall layout of a physical environment of a user. As such, receiving the indication of the one or more second objects may comprise receiving, from an XR device, detailed information about the physical environment above and beyond that which may be easily ascertained by video data.

A user may be required to provide a particular format of information relating to the one or more second objects. For example, in higher security circumstances, a user may be required to provide video of the physical environment, rather than being allowed to provide an audio and/or textual description of the one or more second objects. This requirement may be tantamount to requiring that the user be physically located in the physical environment in order for the user to be authenticated. As another example, in lower security circumstances, the user may be permitted to use audio and/or textual descriptions of the one or more second objects to authenticate themselves. That said, this approach can be risky because it may be more easily spoofed by a malicious user, such that a user may be required to provide more specificity via audio/text than they would via video. For example, while a user might not be required to provide extensive detail of their physical environment via video, they may be required to provide a comparatively more detailed amount of information about their physical environment via a verbal description and/or text.

In step 406, the computing device may determine whether to grant access to the account. Determining whether to grant access to the account may be based on comparing the one or more second objects to the one or more first objects. In other words, this process may determine whether any differences between the one or more first objects and the one or more second objects indicate that the user has accurately described the physical environment. If the computing device decides to grant access to the account, the method 400 may proceed to step 407. Otherwise, if the computing device decides to not provide access to the account, the method 400 may end.

Determining whether to grant access to the account may be based on differences between the one or more first objects determined as part of step 402 and the one or more second objects indicated as part of step 405. In some circumstances, the one or more first objects determined as part of step 402 and the one or more second objects indicated as part of step 405 may be the same or similar. With that said, the objects need not be identical, and all aspects of the objects need not be identical. For example, the one or more first objects determined as part of step 402 may comprise a chair at a desk, and the one or more second objects indicated as part of step 405 may comprise the same chair near a wall. In such a circumstance, the chair may be the same, but it may have been moved by a user. As another example, the one or more first objects determined as part of step 402 may comprise a couch, and the one or more second objects indicated as part of step 405 may comprise a bed. In such a circumstance, the couch may be a fold-out bed, such that the objects may be substantially the same (albeit described, in video, audio, or textual form, at different times). As yet another example, the one or more first objects determined as part of step 402 may comprise five objects, and the one or more second objects indicated as part of step 405 may comprise six objects. In such a circumstance, the only difference may be the addition of new furniture to the same room.

Deciding whether to grant access to the account may be based, at least in part, on a difference in time between the information received as part of step 401 and the indications received as part of step 405. Differences in time may cause one or more objects in a physical environment to change. As a simple example, a room may be brightly-lit during the daytime, but may be dark during the evening, such that lamps may be turned on or off based on the time of day. In turn, the one or more first objects determined as part of step 402 may comprise a turned-off lamp, and the one or more second objects indicated as part of step 405 may comprise the same lamp that has been turned on. As such, the computing device may determine whether to grant access to an account based on both the differences in the objects and the differences in time between those objects. For example, the computing device may determine a first time associated with a video received as part of step 401, determine a second time associated with the indication of the one or more second objects, and then determine whether to grant access to an account based on comparing the first time and the second time.

Deciding whether to grant access to the account may be based, at least in part, on changes in location of objects determined as part of step 402 and the indications received as part of step 405. As already indicated above, objects may move within a physical environment, such that the same chair may be located in different locations in the same physical environment. In turn, the computing device may determine to grant access to an account based, at least in part, on determining whether differences in locations of objects is to be expected. For example, the computing device may determine a first location of at least one object of the one or more first objects, determine a second location of a corresponding object of the one or more second objects, and then compare the first location and the second location. Based on that comparing, the computing device may determine whether to grant access to the account. That determination may be based, in part, on whether the difference in location of an object is reasonable. For example, while it may be expected that small furniture (e.g., a chair) may move around a physical environment, it would be unusual for a window to move to different locations on a wall.

Deciding whether to grant access to the account may be based in part on other information about the request received in step 403. The request received in step 403 may comprise geolocation data, such that determining whether to grant access to the account may be based on determining whether the geolocation data corresponds to the physical environment. After all, if a user provides video purporting to be from the physical location but their geolocation data suggests that they are not in the physical location, this may suggest that they are falsifying their presence in the physical location. The request received in step 403 may additionally and/or alternatively comprise additional authentication data, such as a username, a password, a two-factor authentication code, or the like. In turn, determining whether to grant access to the account may be based on the validity of that additional authentication data.

In step 407, the computing device may provide access to the account. For example, the computing device may grant the user device access to the account based on comparing the one or more first objects to the one or more second objects. Access to the account may be provided by, e.g., providing a user device access to a protected portion of a website, transmitting confidential data to a user device, allowing a user to request, modify, and/or receive personal data, or the like.

Figure 5A:
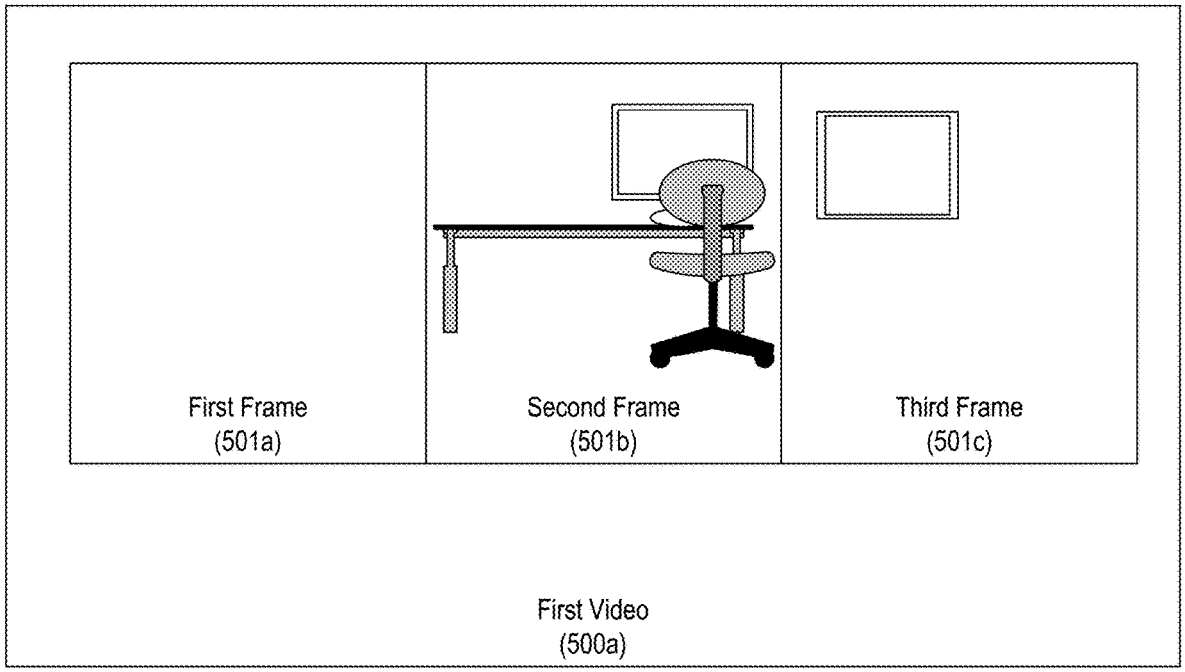
FIG. 5A depicts a first video of a physical environment.

FIG. 5A depicts a first video 500a, which may be provided as part of step 401 of FIG. 4. The first video 500a has three frames: a first frame 501a depicting nothing, a second frame 501b depicting a computer monitor, a desk, and a chair, and a third frame 501c depicting a bright window. Such frames may be part of a larger series of frames of the first video 500a, which may have been captured by a user. The frames depicted in FIG. 5A (and, in turn, FIG. 5B, discussed below) are illustrative. In other words, the first video 500a may have a wide variety of frames, and the particular method with which objects are detected in those frames may vary in a variety of ways. For example, in some circumstances, the window in the third frame 501c may be detected by comparing the third frame 501c to a predetermined image of a window and determining that the similarity satisfies a predetermined threshold.

Figure 5B:
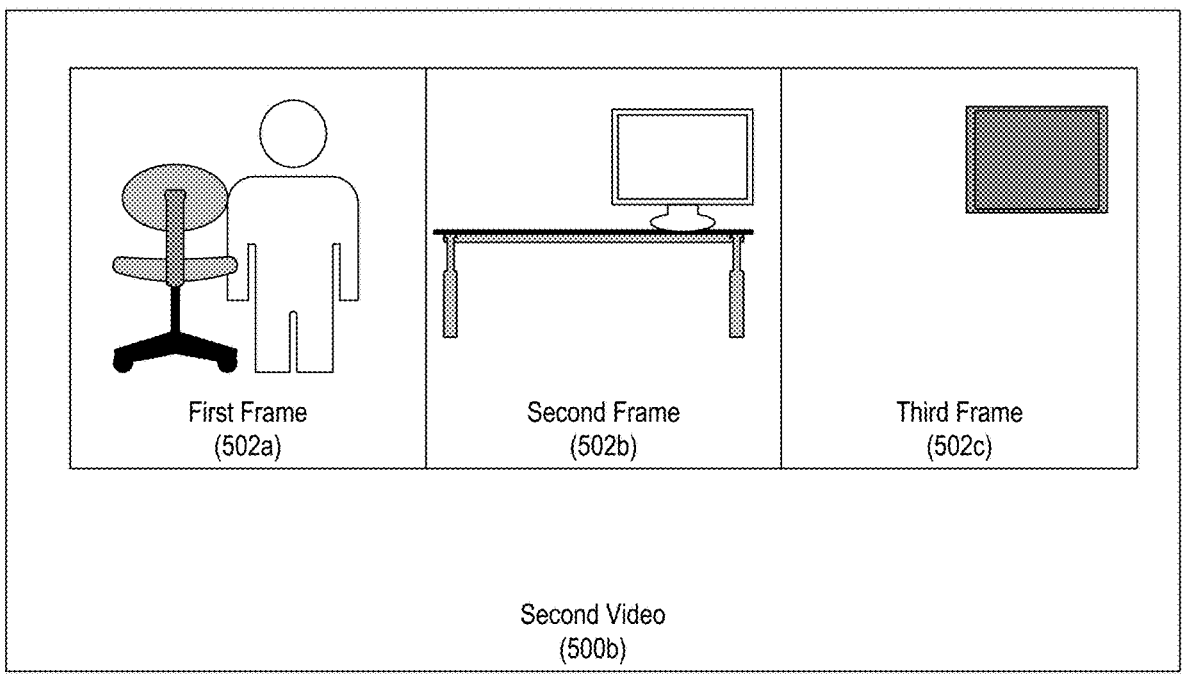
FIG. 5B depicts a second video of a physical environment.

FIG. 5B depicts a second video 500b, which may be provided as part of step 405 of FIG. 4. The second video 500b has three frames: a first frame 502a depicting a chair and a user, a second frame 502b depicting a desk and a computer monitor, and a third frame 502c depicting a dark window. Comparing the first video 500a of FIG. 5A and the second video 500b of FIG. 5B, one can see that the two videos reflect different times of day, as well as different locations of various objects. In particular, the first video 500a likely represents daytime (because the window in the third frame 501c is bright), whereas the second video 500b depicts nighttime (because the window in the third frame 502c is dark). Moreover, the first video 500a depicts the chair as near the desk (and in the second frame 501b), whereas the second frame 502b depicts the chair away from the desk (and in the first frame 502a). Moreover, the second video 500b depicts a user, whereas the first video 500a does not.

The differences between the first video 500a and the second video 500b illustrate that, even though the video provided as part of step 401 of FIG. 4 and the video provided as part of step 405 of FIG. 4 may be different, the videos may depict the same physical environment (e.g., just at different times). In turn, as part of determining whether to grant access to an account as part of step 406 of FIG. 4, the computing device need not require exactitude. In other words, the two videos need not be the same, and the objects represented in the two videos need not be the same. This is particularly the case where the videos might not be recorded using the same device and/or in the same manner. Rather, the computing device may compare objects to determine whether the two sets of objects are likely to be reflective of the same physical environment, even if they are not perfectly the same. After all, if near exactitude were required, a user might be forced to record in an unusually forced or limited manner.

FIG. 6A depicts processed audio data 600. The processed audio data 600 may represent text data which is the output of a speech recognition algorithm or similar speech-to-text algorithm. For example, a user may record, using a microphone of a smartphone, a verbal description of the physical environment. Then, the computing device may use a speech recognition algorithm to process this recording to determine text corresponding to the recording. That text (e.g., the processed audio data 600) may be processed as part of step 405 of FIG. 4 using a natural language processing algorithm to identify one or more objects referenced by the user. For example, in the case of the processed audio data 600, the objects may comprise the "white desk in the corner," the "window," the "fireplace on the other wall," the "closet near the door," three instances of a "painting on the wall," and blue walls.

FIG. 6B depicts text data 601. The text data 601 may have been provided by a user through textual input into an input field of a user interface, such as may be displayed on a computing device such as a smartphone. The text data 601 may be processed as part of step 405 of FIG. 4 using a natural language processing algorithm to identify one or more objects referenced by the user. For example, in the case of the text data 601, the objects may comprise the "one door," the "closet," two "lamps," the "window," the "desk," two "monitors," and blue walls.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
one or more processors; and
memory storing instructions that, when executed by the one or more processors of the computing device, cause the computing device to:
receive video depicting a physical environment;
process the video to identify one or more first objects in the physical environment;
receive, from a user device, a request for access to an account associated with a user;
send, to the user device, a prompt for a physical environment description;
receive, from the user device and in response to the prompt, an indication of one or more second objects by:
receiving, via the user device, data comprising audio data associated with the user verbally describing the physical environment; and
processing, using one or more speech recognition algorithms, the audio data to identify the one or more second objects; and
grant the user device access to the account based on comparing the one or more first objects to the one or more second objects.

2. The computing device of claim 1, wherein the instructions, when executed by the one or more processors, cause the computing device to receive the indication of the one or more second objects by causing the computing device to:
receive, from the user device, a second video depicting the physical environment; and
process the second video to identify the one or more second objects.

3. The computing device of claim 1, wherein the instructions, when executed by the one or more processors, cause the computing device to process the audio data by causing the computing device to:
generate text corresponding to the audio data.

4. The computing device of claim 1, wherein the instructions, when executed by the one or more processors, cause the computing device to receive the indication of the one or more second objects by causing the computing device to:
receive, from the user device, text data describing the physical environment; and
process, using one or more natural language processing algorithms, the text data to identify the one or more second objects.

5. The computing device of claim 1, wherein the instructions, when executed by the one or more processors, cause the computing device to process the video to identify the one or more first objects by causing the computing device to:
train, using training data comprising a plurality of different videos with tagged objects, a machine learning model to identify objects in videos;
provide, as input to the trained machine learning model, the video; and
receive, as output from the trained machine learning model and in response to the input, an indication of the one or more first objects.

6. The computing device of claim 1, wherein the instructions, when executed by the one or more processors, cause the computing device to receive the indication of the one or more second objects by causing the computing device to:
cause a camera of an Extended Reality (XR) device to capture second video corresponding to a current physical environment of the user; and
receive, via the XR device, the second video.

7. The computing device of claim 1, wherein the instructions, when executed by the one or more processors, cause the computing device to:
determine a first time associated with the video; and
determine a second time associated with the indication of the one or more second objects,
wherein the instructions, when executed by the one or more processors, cause the computing device to grant the user device access to the account based on comparing the first time and the second time.

8. The computing device of claim 1, wherein the instructions, when executed by the one or more processors, cause the computing device to grant the user device access to the account based on comparing the one or more first objects to the one or more second objects by causing the computing device to:
determine a first location of at least one object of the one or more first objects;
determine a second location of a corresponding object of the one or more second objects; and
compare the first location and the second location.

9. The computing device of claim 1, wherein a first object of the one or more second objects is the same as a corresponding object of the one or more first objects, and wherein the first object is in a different location than the corresponding object.

10. A method comprising:
receiving, by a computing device, video depicting a physical environment;
processing, by the computing device, the video to identify one or more first objects in the physical environment;
receiving, by the computing device and from a user device, a request for access to an account associated with a user;
sending, by the computing device and to the user device, a prompt for a physical environment description;
receiving, by the computing device and from the user device and in response to the prompt, an indication of one or more second objects by:
receiving, via the user device, data comprising audio data associated with the user verbally describing the physical environment; and
processing, using one or more speech recognition algorithms, the audio data to identify the one or more second objects; and
granting, by the computing device, the user device access to the account based on comparing the one or more first objects to the one or more second objects.

11. The method of claim 10, wherein the receiving the indication of the one or more second objects comprises:
receiving, from the user device, a second video depicting the physical environment; and
processing the second video to identify the one or more second objects.

12. The method of claim 10, wherein the processing the audio data comprises:
generate text corresponding to the audio data.

13. The method of claim 10, wherein the receiving the indication of the one or more second objects comprises:
receiving, from the user device, text data describing the physical environment; and processing, using one or more natural language processing algorithms, the text data to identify the one or more second objects.

14. The method of claim 10, wherein the processing the video to identify the one or more first objects comprises:
training, using training data comprising a plurality of different videos with tagged objects, a machine learning model to identify objects in videos;
providing, as input to the trained machine learning model, the video; and
receiving, as output from the trained machine learning model and in response to the input, an indication of the one or more first objects.

15. The method of claim 10, wherein the receiving the indication of the one or more second objects comprises:
causing a camera of an Extended Reality (XR) device to capture second video corresponding to a current physical environment of the user; and
receiving, via the XR device, the second video.

16. One or more non-transitory computer-readable media storing instructions that, when executed by one or more processors of a computing device, cause the computing device to:
receive video depicting a physical environment;
process the video to identify one or more first objects in the physical environment;
receive, from a user device, a request for access to an account associated with a user;
send, to the user device, a prompt for a physical environment description;
receive, from the user device and in response to the prompt, an indication of one or more second objects by:
receiving, via the user device, data comprising audio data associated with the user verbally describing the physical environment; and
processing, using one or more speech recognition algorithms, the audio data to identify the one or more second objects; and
grant the user device access to the account based on comparing the one or more first objects to the one or more second objects.

17. The non-transitory computer-readable media of claim 16, wherein the instructions, when executed by the one or more processors, cause the computing device to receive the indication of the one or more second objects by causing the computing device to:
receive, from the user device, a second video depicting the physical environment; and
process the second video to identify the one or more second objects.

18. The non-transitory computer-readable media of claim 16, wherein the instructions, when executed by the one or more processors, cause the computing device to process the audio data by causing the computing device to:
generate text corresponding to the audio data.

19. The non-transitory computer-readable media of claim 16, wherein the instructions, when executed by the one or more processors, cause the computing device to receive the indication of the one or more second objects by causing the computing device to:
receive, from the user device, text data describing the physical environment; and
process, using one or more natural language processing algorithms, the text data to identify the one or more second objects.

20. The non-transitory computer-readable media of claim 16, wherein the instructions, when executed by the one or more processors, cause the computing device to process the video to identify the one or more first objects by causing the computing device to:
train, using training data comprising a plurality of different videos with tagged objects, a machine learning model to identify objects in videos;
provide, as input to the trained machine learning model, the video; and
receive, as output from the trained machine learning model and in response to the input, an indication of the one or more first objects.

* * * * *